United States Patent
Kaus et al.

(10) Patent No.: US 8,660,325 B2
(45) Date of Patent: Feb. 25, 2014

(54) EFFICIENT USER INTERACTION WITH POLYGONAL MESHES FOR MEDICAL IMAGE SEGMENTATION

(75) Inventors: Michael R. Kaus, Toronto (CA); Laura A. Dawson, Toronto (CA)

(73) Assignee: Koninklijke Philips N.V., Eindhoven (NL)

( * ) Notice: Subject to any disclaimer, the term of this patent is extended or adjusted under 35 U.S.C. 154(b) by 1125 days.

(21) Appl. No.: 12/374,108

(22) PCT Filed: Jul. 2, 2007

(86) PCT No.: PCT/US2007/072646
§ 371 (c)(1),
(2), (4) Date: Jan. 16, 2009

(87) PCT Pub. No.: WO2008/011268
PCT Pub. Date: Jan. 24, 2008

(65) Prior Publication Data
US 2009/0310835 A1  Dec. 17, 2009

Related U.S. Application Data

(60) Provisional application No. 60/807,531, filed on Jul. 17, 2006.

(51) Int. Cl.
*G06K 9/00* (2006.01)
(52) U.S. Cl.
USPC .............. 382/128; 382/241; 378/65; 600/425
(58) Field of Classification Search
USPC ....................... 382/128, 241; 378/65; 600/425
See application file for complete search history.

(56) References Cited

U.S. PATENT DOCUMENTS

| 5,782,762 | A | * | 7/1998 | Vining .......................... 600/407 |
| 5,809,169 | A | | 9/1998 | Rezzouk et al. |
| 5,859,891 | A | * | 1/1999 | Hibbard .......................... 378/62 |
| 6,169,817 | B1 | * | 1/2001 | Parker et al. ................... 382/131 |

(Continued)

FOREIGN PATENT DOCUMENTS

| JP | 61226673 A | 10/1986 |
| JP | 8272959 A | 10/1996 |

(Continued)

OTHER PUBLICATIONS

Bogush, A. L., et al.; 3D Object Reconstruction from Non-parallel Cross-sections; 2004; IEEE Proc. of Pattern Recognition; vol. 3; pp. 542-545 Date of Current Version: Sep. 20, 2004; Issue Date: Aug. 23-26, 2004.

(Continued)

*Primary Examiner* — Chan Park
*Assistant Examiner* — Eueng-Nan Yeh (57) ABSTRACT

An apparatus for delineating a structure of interest includes: a plane selection interface (32, 70) for selecting a contouring plane of selectable orientation in a three-dimensional image or map (80); a contouring interface (32, 72) for defining a contour in the selected contour plane; and a mesh constructor (74, 76) configured to construct a three-dimensional polygonal mesh (90) delineating the structure of interest in the three-dimensional image or map. The mesh constructor positions constrained vertices (102, Vc) on or near a plurality of non-coplanar delineation contours (84, Ccor, Cobl) defined using the contouring interface.

17 Claims, 5 Drawing Sheets

(56) References Cited

U.S. PATENT DOCUMENTS

| | | |
|---|---|---|
| 6,249,594 B1 | 6/2001 | Hibbard |
| 6,735,277 B2 | 5/2004 | McNutt et al. |
| 6,828,787 B2 | 12/2004 | Oesingmann |
| 2002/0168618 A1* | 11/2002 | Anderson et al. ............. 434/262 |
| 2003/0088389 A1* | 5/2003 | Balaniuk et al. ................. 703/2 |

FOREIGN PATENT DOCUMENTS

| | | |
|---|---|---|
| JP | 2002210027 A | 7/2002 |
| JP | 2003225225 A | 8/2003 |
| WO | 2004053792 A1 | 6/2004 |
| WO | 2004111937 A1 | 12/2004 |
| WO | 2005031629 A1 | 4/2005 |
| WO | 2006016317 A2 | 2/2006 |

OTHER PUBLICATIONS

Bogush, A. L., et al.; 3D Object Volume Measurement Using Freehand Ultrasound; 2005; Image Analysis: LNCS; vol. 3540; pp. 1066-1075 Jun. 30, 2005.

De Brun, P. W., et al.; Interactive 3D segmentation using connected orthogonal contours; 2005; Computers in Biology and Medicine; vol. 35; pp. 329-346 May 2005.

Gibson, S. F. F.; Constrained Elastic Surface Nets: Generating Smooth Surfaces from Binary Segmented Data; 1998; Medical Image Computing and Computer Assisted Intervention; pp. 888-898. Oct. 11-13, 1998.

Falcao, A. X., et al.; A 3D generalization of user-steered live-wire segmentation; 2000; Medical Image Analysis; 4:389-402 Online: Nov. 28, 2000 Printed Issue: Dec. 2000.

Karangelis, G.; 3D Simulation of External Beam Radiotherapy; 2004; Darmstaedler Dissertation-D17; Technischen Universitat Darmstadt. Dec. 13, 2004.

Sheynin, S. A., et al.; Improvements of Volume Computation from Non-parallel Cross-sections; 2004; Proc. Intl. Conf. Pattern Recognition; vol. 3; pp. 542-545. Aug. 23-26, 2004.

Snezhko, E. V., et al.; External Force Generation for Object Segmentation on 3D Ultrasound Images Using Simplex Meshes; 2006; Pattern Recognition and Image Analysis; 16(1)89-92. Mar. 31, 2006.

Zhang, H., et al.; Surface Reconstruction from Orthogonal Contours; Proc. SPIE: Medical Imaging; vol. 6141; 7 pages Mar. 10, 2006.

Imao, K.; A Deformation Method of Body Shape Models Based on Silhouette Images of Persons for Virtual Fitting Rooms; 1999; IEEE Trans. on Institute of Electronics; J82-D-II(10)1684-1692, (published before this application Jul. 2006).

* cited by examiner

EFFICIENT USER INTERACTION WITH POLYGONAL MESHES FOR MEDICAL IMAGE SEGMENTATION

CROSS REFERENCE TO RELATED APPLICATIONS

This application claims the benefit of U.S. provisional application Ser. No. 60/807,531 filed Jul. 17, 2006, which is incorporated herein by reference.

The following relates to the graphical arts. It is described with example reference to medical applications in which structures of a medical image are to be defined preparatory to radiation therapy planning or other medical procedure planning. However, the following relates more generally to defining structures in substantially any type of three-dimensional image, three-dimensional map, or the like, and to applications other than radiation therapy planning, such as visualization or other post-acquisition image processing, sculpting out features in a three-dimensional image to enable viewing or other post-acquisition image processing of hidden anatomical structures, estimating absorption characteristics of structures for use in subsequent SPECT or PET imaging data reconstruction, or so forth.

In oncological radiation therapy (sometimes called radiotherapy), ionizing radiation is applied to kill or retard growth of cancerous tumors or growths. Problematically, however, the radiation also adversely affects surrounding healthy tissue.

In intensity modulated radiation therapy, one or more radiation beams are applied to a patient, with a configuration biased toward irradiating the cancerous tumor or growth and biased away from irradiating biologically critical healthy tissue. In fixed-beam approaches, a plurality of crossing beams are applied simultaneously such that the beams overlap within the patient. The spatial beam intensity profile of each beam is controlled, for example by multi-leaf collimators. By suitable selection of the spatial beam intensity profiles, and taking into account the crossing of beamlets from different beams within the patient, a desired three-dimensional profile of radiation intensity in the patient can be achieved. In tomographic approaches, at least one beam is rotated or stepped around the patient, with the spatial beam intensity profile modified during the rotation or stepping such that the time-integrated radiation dosage matches the desired three-dimensional profile within the patient.

Effective application of intensity modulated radiation therapy relies upon having a priori knowledge of the shape and size of the cancerous tumor or growth, as well as having a priori knowledge of the shape and size of neighboring critical tissues whose radiation exposure should be minimized or kept below a threshold value. In a common approach, this a priori knowledge is obtained using a medical imaging technique such as transmission computed tomography (CT), single-photon emission computed tomography (SPECT), positron emission tomography (PET), magnetic resonance imaging (MRI), or the like. For radiotherapy planning, CT has the advantage of providing anatomical information and tissue radiation absorption characteristics. The latter is typically taken into account during planning of the radiation therapy session, to more accurately compute the three-dimensional radiation profile. Some example techniques for planning of an intensity modulated radiation therapy session based on CT planning images are described, for example, in McNutt et al., U.S. Pat. No. 6,735,277.

During radiotherapy planning, the CT planning image is analyzed to identify the cancerous tumor or growth as well as critical structures whose radiation exposure is to be limited. One approach is to model a structure of interest using a surface mesh, and to use an automated mesh deformation technique to deform the mesh to align with the surface of the structure of interest. Typically, the surface is defined by intensity gradients in the CT image.

Contouring critical and target structures is a sensitive, labor-intensive, and time-consuming process. For example, contouring of the head and neck in a three-dimensional image or map preparatory to radiation therapy can take several hours. Automated segmentation algorithms have been developed to improve the process, and have been applied to delineation of at-risk organs in various treatment sites such as the prostate, liver, breast, lungs, and brain. In one approach, a polygonal mesh with triangular elements is deformed under elasticity and image feature constraints to match an object's surface in an image. Prior knowledge is encoded in such an algorithm by providing average meshes for initialization, and encoding characteristics regarding grey value range, gradient strength etc. on the surface into each model.

Existing automated mesh deformation techniques have certain limitations, however. For example, if the surface of the structure of interest is not well-defined, the fitted mesh may be inaccurate or uncertain. Some structures, such as the lymph nodes in the neck, have sufficiently poor image contrast to effectively preclude the use of automated segmentation on these features. In other cases, most of the structure may have sufficient image contrast to enable automated segmentation, but certain portions of the imaged structure may exhibit poor image contrast, resulting in failure or substantial errors in the automated segmentation in those poor-contrast areas.

It is known to supplement image features with manually drawn contours. For example, Pekar et al., Int'l. Application Publ. No. WO 2004/111937 A1, discloses an approach for applying deformation techniques in regions of a three-dimensional dataset made up of two-dimensional slices. Where the slices provide insufficient feature information such that the automated segmentation fails, the user may manually define attractors in the problematic slices. The manually drawn attractors are then used during subsequent automated mesh deformation to guide the automated segmentation in the problematic axial slices.

It is also known to allow for manual interaction with the mesh, for example by providing the user with a graphical user interface and click-and-drag pointer instrument (e.g., mouse) operational interfacing. For example, Kaus et al., Int'l Application Publ. No. WO 2004/053792 A1, discloses a method of segmenting a three-dimensional structure using automated deformable mesh optimization, with initial and/or subsequent manual displacement of mesh vertices or nodes in selected regions of the automated mesh fit, optionally followed by further optimization of the mesh.

Such existing techniques are not entirely satisfactory where large portions of the structure of interest are poorly defined in the three-dimensional image. Applying the approach of Pekar to such cases calls for drawing attractors in many slices of the three-dimensional dataset that intersect the extended portion or portions of the structure of interest having poor contrast. This is a time-consuming and tedious process. Moreover, it may be difficult for the user to visually identify the structure of interest in the slice image so as to draw in the attractors. Applying the approach of Kaus to such cases calls for initial and/or corrective manual adjustment of many vertices or nodes of the mesh, which is again a time-consuming and tedious process.

In the present disclosure, method and apparatus embodiments are disclosed.

In an example method of delineating a structure of interest in a three-dimensional image or map, at least two contours delineating the structure of interest are defined. The at least two contours lie in at least two different contouring planes that are different and non-parallel respective to each other. A three-dimensional polygonal mesh is fitted while respecting the defined contours as constraints on vertices of the polygonal mesh.

In an example apparatus, a plane selection interface is provided for selecting a contouring plane of selectable orientation in a three-dimensional image or map. A contouring interface is provided for defining a contour in the selected contour plane. A mesh constructor is configured to construct a three-dimensional polygonal mesh delineating a structure of interest in the three-dimensional image or map. The mesh constructor positions constrained vertices on or near a plurality of non-coplanar delineation contours defined using the contouring interface.

In an example apparatus which is operative in conjunction with an adaptive treatment process, a segmenting processor is configured to delineate a structure. The segmenting processor includes: (i) a contouring interface configured to define structure-delineating contours in at least two different, non-parallel contouring planes; and (ii) a mesh constructor for constructing a mesh using a mesh deformation process constrained at least by the defined structure-delineating contours. A planning processor is configured to identify parameters for adaptive treatment of a subject based on delineation via the segmenting processor of at least one structure of interest in a three-dimensional image or map of the subject.

One advantage resides in facilitating rapid and accurate segmentation or delineation of structures of interest.

Another advantage resides in efficient integration of manual and automated inputs to a mesh deformation process.

Another advantage resides in more rapid and accurate planning of adaptive treatment processes such as intensity modulated radiation therapy.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
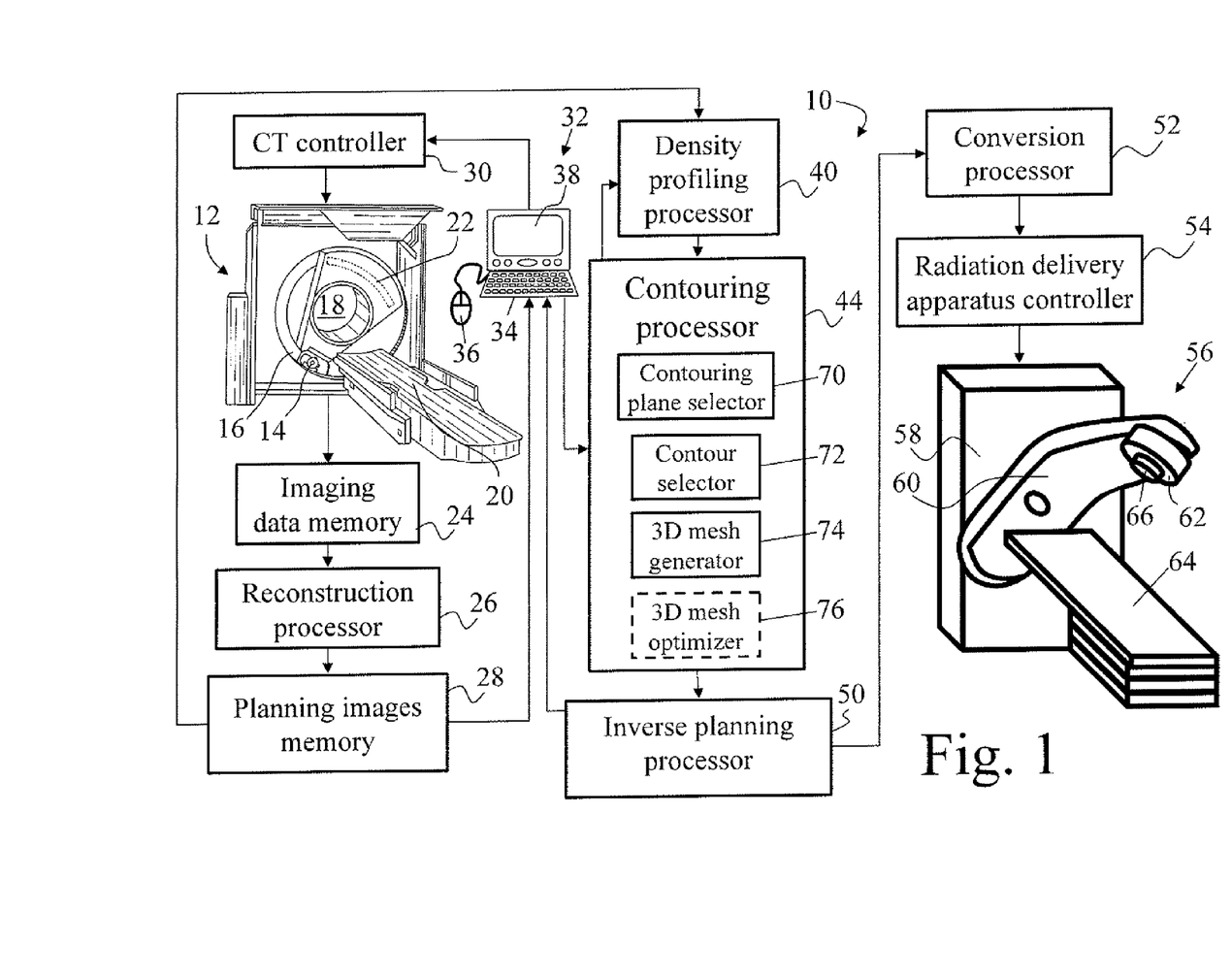
FIG. 1 diagrammatically shows an example intensity modulated radiation therapy system including CT imaging based planning.

With reference to FIG. 1, a radiation therapy system 10 includes a computed tomography (CT) scanner 12 for obtaining CT planning images for use in planning an intensity modulated radiation therapy treatment session. The CT scanner 12 includes an x-ray source 14 mounted on a rotating gantry 16 so as to revolve around an examination region 18, a couch or other support 20 for positioning a subject in the examination region 18, and an x-ray detector array 22 arranged on the rotating gantry 16 opposite the x-ray source 14 to detect x-rays after they have passed through the subject in the examination region 18. The CT scanner 12 is used to acquire projection data, such as projection data for a plurality of axial image slices (e.g., a multi-slice CT scanner), or a helical three-dimensional projection dataset (e.g., a helical CT scanner), or so forth. The projection data are stored in an imaging data memory 24, and are reconstructed by a reconstruction processor 26 using a suitable algorithm such as filtered backprojection to generate a plurality of stacked axial image slices or other image data structures defining a three-dimensional image or map of the subject that is stored in a planning images memory 28. The CT scanner 12 is operated by a CT controller 30 that sets or controls scan parameters such as gantry rotation rate, helical pitch (in the case of a helical scan), axial scan distance, and so forth. A user interface 32 including at least one input device, such as an illustrated keyboard 34, a pointing device such as an illustrated mouse 36, or so forth, and at least one output device, such as the illustrated display 38, is provided to enable a user to interface with the CT controller 30 to operate the CT scanner 12 to acquire planning images for planning an intensity modulated radiation therapy session.

The described CT scanner 12 is an illustrative example of a planning image or map acquisition system. In other embodiments, planning images may be acquired using a single photon emission computed tomography (SPECT) system, a positron emission tomography (PET) scanner, a magnetic resonance (MR) scanner, or so forth. Moreover, the techniques disclosed herein for delineating structures of interest in a planning image are applicable to other adaptive treatment processes besides intensity modulated radiation therapy. For example, the structure-delineating techniques disclosed herein are applicable to planning for surgical treatment such as stent implantation. Here, the structure of the stent is advantageously determined by non-invasive imaging and vessel delineation in accordance with techniques disclosed herein, so that a customized stent can be manufactured and available at the time of the stent implantation procedure. The choice of planning image or map acquisition system may be based on the type of adaptive treatment process being planned. For example, in the case of stent implantation planning, MR imaging employing a suitable intravenous magnetic contrast agent is suitable.

Still further, the structure-delineating techniques disclosed herein have other applications beyond planning of adaptive treatment processes. For example, the structure-delineating techniques disclosed herein may be used in visualization or other post-acquisition image processing. In one example application, the structure-delineating techniques disclosed herein are used to delineate organs that are then sculpted out of a three-dimensional image to enable viewing or other post-acquisition image processing of hidden anatomical structures. As yet another example application, the structure delineating techniques disclosed herein can be used to estimate absorption characteristics of structures for use in subsequent SPECT or PET imaging data reconstruction.

Returning to the example application of intensity modulated radiation therapy illustrated in FIG. 1, the planning image or map acquisition system 12 is separate from an intensity modulated radiation therapy system to be described. Preferably, fiducial markers are attached to the subject prior to acquiring the planning images, and these markers remain in place until the subsequent radiotherapy session to provide spatial registration between the planning image or map and the radiotherapy delivery. Other methods for spatial registering between planning image or map acquisition system and the radiotherapy system are also contemplated, such as using intrinsic anatomical markers such as distinctive bone structures. Furthermore, it is also contemplated to integrate the planning images or mapping acquisition system with the radiotherapy apparatus so that a common coordinate system is used for both planning images acquisition and radiation therapy.

With continuing reference to FIG. 1, a density profiling processor 40 optionally computes a density profile map of the subject. Such a density profile is typically used to estimate absorption of therapeutic radiation during radiation therapy. Advantageously, if the planning imaging technique is transmission CT as illustrated, then the absorption of therapeutic radiation is typically relatively accurately estimated based on absorption of x-rays from the x-ray tube 12 as indicated in the CT planning images. In some embodiments, the structure-delineating techniques disclosed herein are used to delineate structures for which density profiles or values are computed. For example, bones may be delineated and assigned a bone density by the density profiling processor 40, and similarly other tissues such as cardiac tissue, lung tissue, muscle tissue, and so forth are delineated and assigned suitable tissue density values by the density profiling processor 40. In this latter approach, the imaging technique can be radiation based (e.g., CT) or non-radiation based (e.g., MR), since the density values are assigned based on anatomical information rather than based on measured x-ray absorption.

A contouring processor 44 delineates structures of interest. In the case of intensity modulated radiation therapy, structures of interest may include, for example, the target cancerous tumor or growth, critical structures whose level of radiation exposure is to be limited, highly absorptive structures that may substantially interfere with delivery of therapeutic radiation, and so forth. The structure delineation information may be used, for example, by the density profiling processor 40 as already described, or by an inverse planning processor 50, or so forth.

One example approach for planning the intensity modulated radiation therapy session based on acquired CT planning images is as follows. The inverse planning processor 50 determines spatial beam intensity profiles for therapeutic radiation beams that provide a desired three-dimensional profile of radiation intensity in the subject. The three-dimensional profile should provide sufficient radiation in the target structure (e.g., cancerous tumor or growth) to hopefully provide an anticipated therapeutic effect (as is understood in the art, variability amongst patients dictates that the anticipated therapeutic effect may unfortunately not occur in some patients, or may occur with varying degrees of effectiveness), while keeping radiation exposure of critical structures such as sensitive vital organs below selected threshold exposure levels. For example, a radiation dosage of 80 Gy can be targeted for the area or areas to receive radiotherapy along with a limit of no more than 20% of this value (i.e., 16 Gy) in a critical structure that would likely be adversely affected by excessive radiation exposure. The planning also optionally incorporates system constraints, such as a maximum therapeutic radiation intensity level deliverable by a therapeutic beam source, spatial resolution limitations, or so forth. In one planning approach, the therapeutic radiation beam is divided mathematically into an array or other plurality of beamlets, and values are computed for the beamlets that provide a desired time-integrated three-dimensional radiation profile in the subject. A conversion processor 52 converts the beamlet parameters to settings for multi-leaf collimators that control the (possibly time-varying) intensity profile of the therapeutic radiation beam or beams.

A radiation delivery apparatus controller 54 operates a radiation delivery apparatus 56 in accordance with the planning information output by the conversion processor 52 so as to deliver therapeutic radiation to the subject in accordance with the plan determined from the CT planning images. The illustrated example radiation delivery apparatus 56 is a tomographic apparatus that has a stationary frame 58 with a rotating arm or gantry 60 on which is mounted a therapeutic radiation source 62. In some embodiments, the source 62 includes a linear electron accelerator (linac) which produces an accelerated electron beam that impinges upon a target made of tungsten or another material to produce a therapeutic beam of x-rays or gamma rays for photon radiotherapy. In other embodiments, the therapeutic radiation source 62 produces other types of radiation, such as proton beams, neutron beams, electron beams, or so forth.

The gantry 62 rotates so as to revolve the therapeutic radiation source 60 around the patient who is positioned on a support 64. In one approach, the support 64 moves the subject linearly during the revolving to effectuate a helical orbit of the radiation source about the subject. Ion another approach, a single slice or slab is irradiated with the support 64 stationary; if a larger area is to be irradiated, the support 64 can be stepped to irradiate a succession of slices or slabs. During the application of the therapeutic radiation, a multi-leaf collimator 66 modulates the spatial intensity profile of the therapeutic radiation beam in accordance with the plan output by the conversion processor 52 so that the time-integrated radiation dosage delivered to the subject accords with the intended three-dimensional radiation profile. Typically, the multi-leaf collimator 66 includes an array of individually movable radiation-blocking paired leaves that together define a selectably sized and shaped radiation aperture.

In the illustrated tomographic radiation delivery apparatus 56, the settings of the multi-leaf collimator 66 are typically varied during the revolving of the source 62 to produce the desired three-dimensional profile. In another approach, a plurality of radiation sources are spaced angularly apart around the subject, with the beams from the radiation sources crossing in the subject. Each beam has an associated multi-leaf collimator that imparts a spatial beam intensity profile in accordance with the plan developed from the CT planning images such that the simultaneously applied beams crossing in the patient provide the desired three-dimensional profile.

In order to register the position of the subject in the radiotherapy session (that is, the position of the subject on the support 64 of the radiation therapy delivery apparatus 56) with the position of the subject in the previously acquired diagnostic images (that is, the position of the subject on the support 20 of the CT system 12), fiducial markers are preferably used. In a suitable embodiment, detectors (not shown) receive low power x-rays produced by the radiation source 62 to effectuate a low-resolution CT imaging which can be used to image the fiduciary markers which were placed on the subject prior to the diagnostic imaging. In another approach, a separate CT scanner (not shown) is integrated with the radiation therapy delivery apparatus to image the fiducial markers.

Having described embodiments of an example intensity modulated radiation therapy application with reference to FIG. 1, embodiments of the contouring processor 44 are now described in greater detail. As shown in FIG. 1, the contouring processor 44 includes a contouring plane selector 70, a contour selector 72, a three-dimensional mesh generator 74, and an optional three-dimensional mesh optimizer 76.

Figure 2:
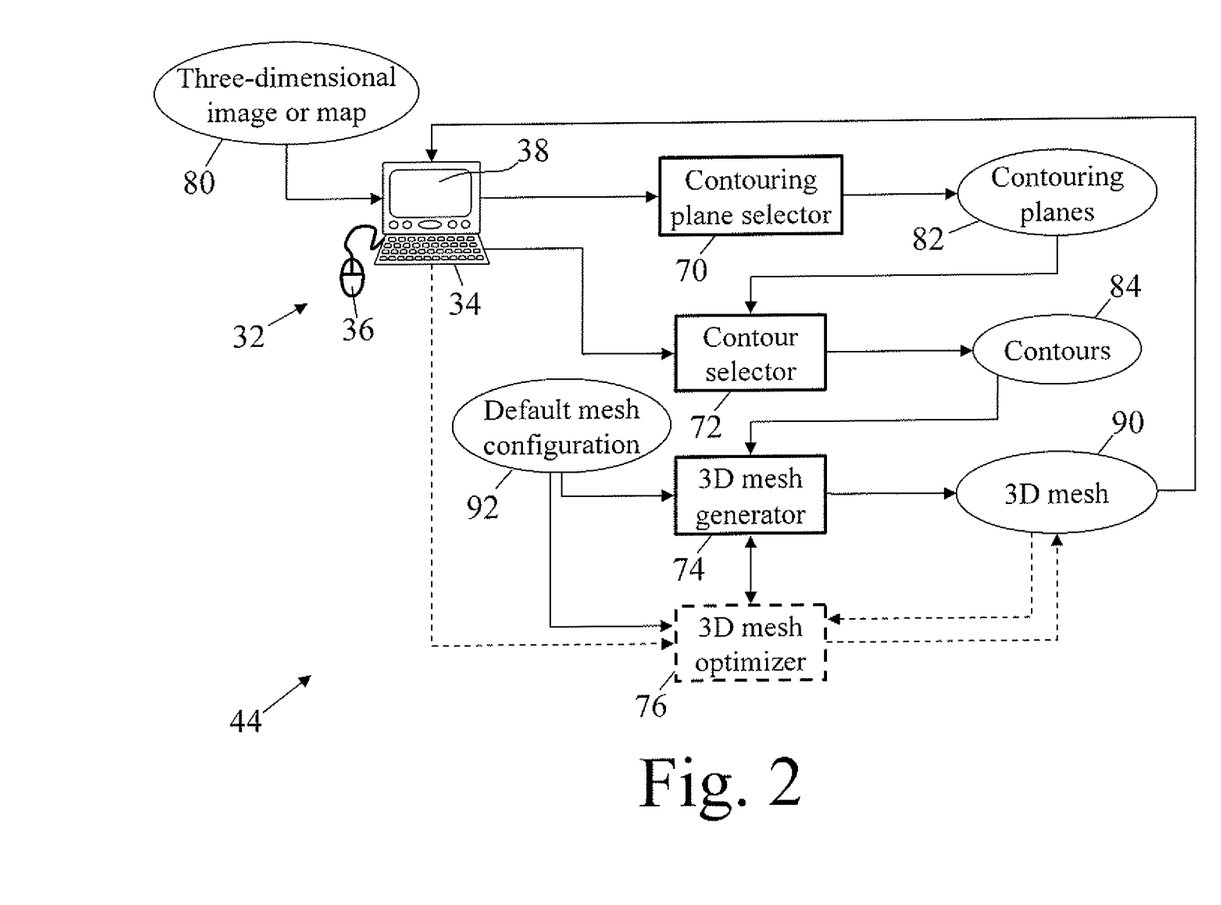
FIG. 2 diagrammatically shows principal components of the contouring processor 44 of FIG. 1 with principal data structures and principal data flow diagrammatically indicated.

With reference to FIG. 2, the contouring processor 44 operates on a three-dimensional image or map 80 generated by the CT scanner 12 and the reconstruction processor 26, without regard to any geometrical nature or aspects of the image or map acquisition. For example, the three-dimensional image or map 80 may be acquired as a series of axial slices; however, the contouring processor 44 treats the three-dimensional image or map 80 without regard to the axial slices. The contouring plane selector 70 operating in conjunction with the user interface 32 allows a user to select two or more contouring planes 82. For example, the three-dimensional image or map 80, or a portion thereof, is suitably displayed on the display 38, and the user operates a graphical pointer using the mouse 36, the keyboard 34, or another input device to select the contouring planes 82. In general, the two or more contouring planes 82 should include at least two different, non-parallel contouring planes to ensure adequate contouring of a three-dimensional structure of interest. In some embodiments, the at least two different, non-parallel contouring planes include at least two different, non-parallel planes selected from the group of planes consisting of sagittal, coronal, and axial planes. In some embodiments, the at least two different, non-parallel contouring planes include at least one oblique plane not belonging to the group of planes consisting of sagittal, coronal, and axial planes.

The contour selector 72 operating in conjunction with the user interface 32 allows a user to select one or more delineation contours 84 in each contouring plane 82. For example, one of the contouring planes 82, or a portion thereof, is suitably displayed on the display 38, and the user operates a graphical pointer using the mouse 36, the keyboard 34, or another input device to draw one or more contours in the displayed contouring plane 82. In one approach, the user designates points that lie on the contour, and the contour is defined by the designated points and by connecting line segments that connect the designated points. Because the contouring planes 82 are user selected, it is possible for the contouring plane to be oriented in an anatomically meaningful way respective to the structure of interest, which promotes easier and more accurate contouring. Moreover, the contours 84 are preferably non-coplanar to ensure adequate contouring of the three-dimensional structure of interest. Typically, this condition is satisfied by drawing contours in each of two or more different, non-parallel contouring planes 82.

The three-dimensional mesh generator 74 constructs a three-dimensional polygonal mesh 90 delineating the structure of interest in the three-dimensional image or map 80. The mesh 90 includes constrained vertices each positioned on or near one or more of the non-coplanar delineation contours 84. In some embodiments, the mesh 90 is constructed by placing vertices of the mesh on the contours 84, without using a deformation process. In other embodiments, the mesh 90 is constructed by starting with a default mesh configuration 92 that is placed close to the structure of interest (for example, by placing it at a center of a bounding box containing the contours 84, or at a center of gravity of the contours 84, or at another average or central position defined by the delineating contours 84, or by placing the default mesh configuration 92 at a center-of-gravity or other average or central position of the image of the structure of interest in the three-dimensional image or map 80), and invoking the optional three-dimensional mesh optimizer 76 to deform the mesh to generate the three-dimensional polygonal mesh 90 delineating the structure of interest in the three-dimensional image or map 80. Optionally, placement of the default mesh configuration 92 includes rotating, translating, scaling, or otherwise manipulating the default mesh configuration to match the contours 84 and/or the image of the structure of interest, for example using an ICP-lie approach.

Figure 3:
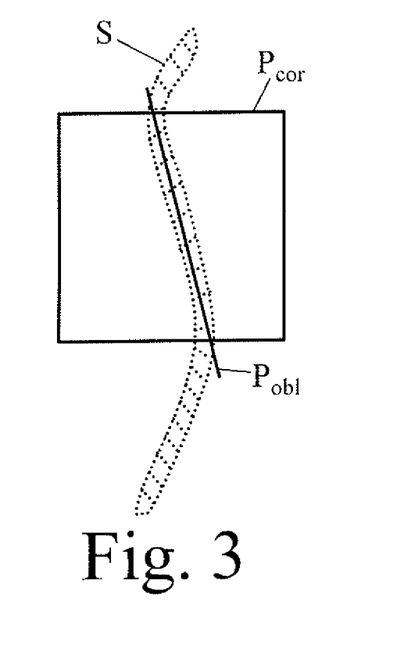
FIG. 3 diagrammatically shows two example contouring planes selected to interest a spine S: a coronal contouring plane $P_{cor}$ and an oblique contouring plane $P_{obl}$ that is oriented orthogonal to the coronal contouring plane $P_{cor}$.
Figure 4:
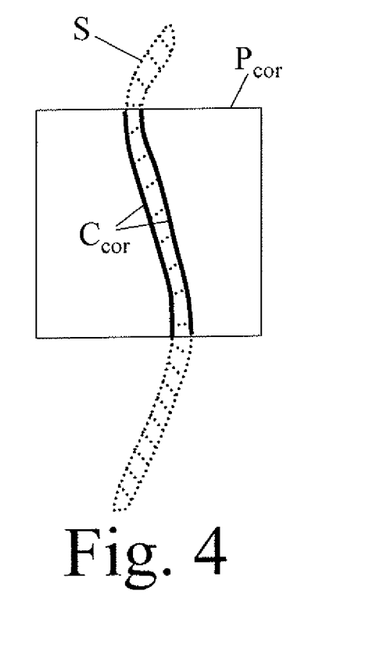
FIG. 4 diagrammatically shows contours $C_{cor}$ delineating the spine S defined in the coronal contouring plane $P_{cor}$.
Figure 5:
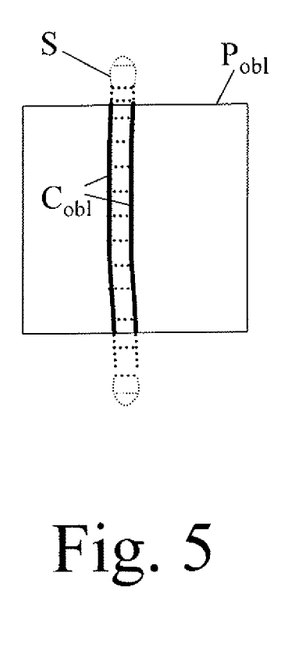
FIG. 5 diagrammatically shows contours $C_{obl}$ delineating the spine S defined in the oblique contouring plane $P_{obl}$.
Figure 6:
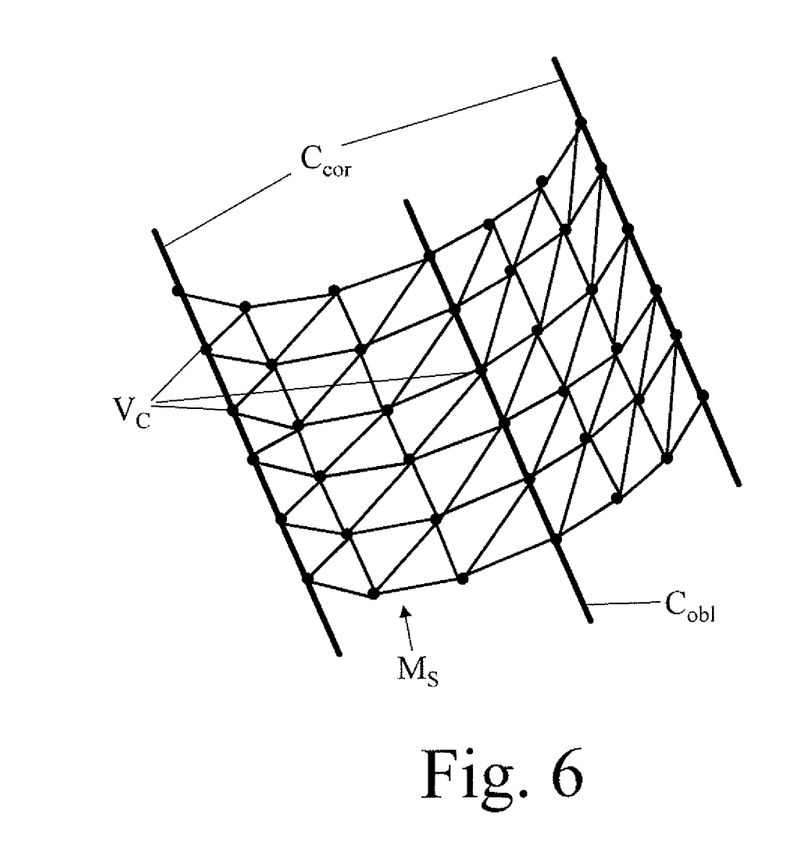
FIG. 6 diagrammatically shows a portion of a polygonal mesh $M_S$ having triangular elements deformed to match the coronal and oblique contours $C_{cor}$, $C_{obl}$ of FIGS. 4 and 5.

With continuing reference to FIG. 2 and with further reference to FIGS. 3-6, operation of the contouring processor 44 is described with reference to an example delineation of a spinal column, such as might be useful, for example in planning an intensity modulated radiation therapy session for treatment of a lung cancer. FIG. 3 shows a coronal view of the spinal column. It will be seen that the "S"-shaped spine S lies substantially within a coronal plane $P_{cor}$. Accordingly, the user advantageously selects the coronal plane $P_{cor}$ as one of the contouring planes 82 using the contouring plane selector 70 operating in conjunction with the user interface 32. Additionally, to adequately delineate the spine S in three-dimensional space, a second contouring plane is advantageously selected. An illustrated oblique plane $P_{obl}$ is suitably selected as a second contouring plane 82 that is different from and non-parallel with the coronal contouring plane $P_{cor}$. (Note that the oblique contouring plane $P_{obl}$ is viewed "edge-on" and hence appears as a line in FIG. 3). In general, it is sometimes advantageous to select two different, non-parallel contouring planes that are oriented substantially orthogonal to one another, as is the case for the illustrated example contouring planes $P_{cor}$ and $P_{obl}$. FIG. 4 shows coronal plane contours $C_{cor}$ drawn in the coronal contouring plane $P_{cor}$. FIG. 5 shows oblique plane contours $C_{obl}$ drawn in the oblique contouring plane $P_{obl}$. FIG. 6 shows a perspective view of a portion of an example mesh $M_S$ constructed by the three-dimensional mesh generator 74 to delineate the spine S. The mesh $M_S$ includes constrained vertices $V_C$ that are constrained to lie on or near the contours $C_{obl}$, $C_{cor}$. The illustrated three-dimensional polygonal mesh $M_S$ employs triangular elements; however, a mesh of other polygonal elements such as quadrilateral elements can also be used.

Figure 7:
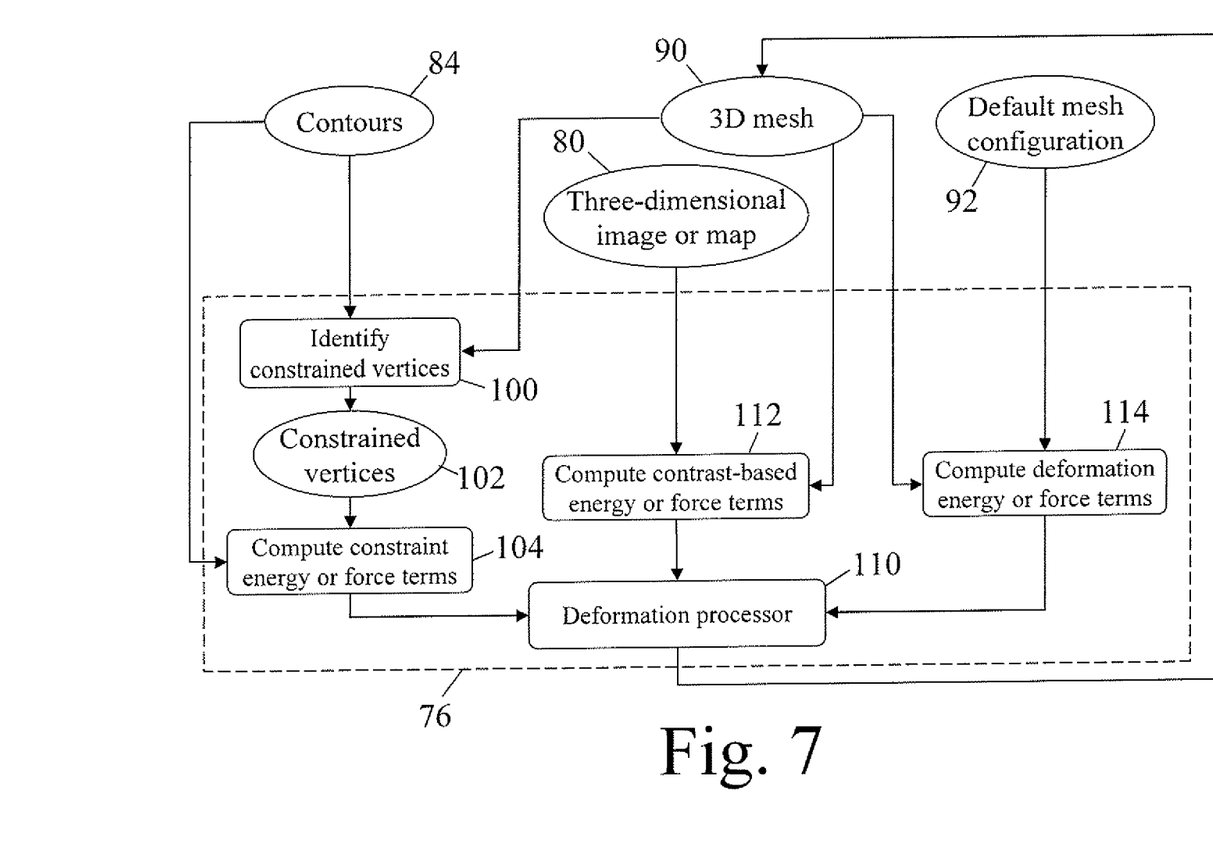
FIG. 7 diagrammatically shows principal components of the three-dimensional mesh optimizer 76 of FIGS. 1 and 2 with principal data structures and data flow diagrammatically indicated.

With reference to FIG. 7, a suitable embodiment of the three-dimensional mesh optimizer 76 is illustrated. The mesh optimizer 76 uses an energy or force minimization algorithm. A constrained vertices identifier 100 identifies constrained vertices 102 as those vertices of the three-dimensional polygonal mesh 90 that are closest to the contours 84. That is, the constrained vertices 102 are identified based on minimum vertex distance from the contours 84. In some embodiments, the constrained vertices 102 are identified using a Euclidean distance transform.

In some embodiments, each of the constrained vertices 102 is moved onto the nearest contour, for example by projecting the vertex onto the contour. The constrained vertices 102 are then held in fixed position during the deformation of the mesh 90. In other embodiments, constraint energy or force terms 104 are computed based on the minimum distance between each constrained vertex and its nearest contour, and the energy or force minimization deformation process incorporates the constraint energy or force terms 104 into the minimization process.

A deformation processor 110 minimizes the energy or force terms. These terms may include, for example, the constraint energy or force terms 104, contrast-based energy or force terms 112 derived from contrast delineating at least a portion of the structure of interest in the three-dimensional image or map 80, and/or deformation energy or force terms 114 derived from an extent of deformation of the three-dimensional polygonal mesh 90 from the default mesh configuration 92. The optional contrast-based energy or force terms 112 incorporate the image contrast for the structure of interest into the mesh deformation process, while the optional deformation energy or force terms 114 account for an expectation that the mesh 90 should not deviate too far from the expected, i.e., default mesh configuration 92. By making the optional constraint energy or force terms dominant (e.g., large) the deformation is strongly biased toward placing each constrained vertex on or near the proximate contour. In other embodiments, each constrained vertex is projected onto the proximate contour, and is not moved by the deformation processor 110.

As another example approach for handling the constrained vertices 102, a smooth initial deformation function is defined based on translating each constrained vertex onto the nearest delineating contour. Other vertices in the vicinity of the constrained vertex are moved according to a translation vector multiplied with a smooth Gaussian function of the geodesic distance to the constrained vertex. The constrained vertices 102 serve as boundary conditions in the deformation process, while the remaining vertex translations are used in computing an external energy that is minimized by the deformation process.

In some embodiments, the three-dimensional polygonal mesh 90 is deformed by the deformation processor 110 based on minimizing an internal energy $E=\Sigma(x_i-y_i)^2$ where $x_i$ and $y_i$ are mesh vertices connected by a single edge, subject to boundary conditions (such as having the constrained vertices at fixed positions on the contours 84) or further including one or more of the energy or force terms 104, 112, 114 into the summation that defines the energy figure-of-merit E.

In some embodiments, the deformation process implemented by the deformation processor 110 is an iterative process, and the constrained vertices 102 are re-identified by the constrained vertices processor 100 during each iteration. In this approach, the sub-set of the vertices of the mesh 90 that make up the constrained vertices may change from one iteration of to the next. In some embodiments, the number of constrained vertices is fixed. In some embodiments, the number of constrained vertices is defined respective to the length of the contours 84, under the assumption that there should be a fixed linear density of constrained vertices for each unit length of contour. In other embodiments, the number of constrained vertices is not fixed, and any vertex whose minimum distance from the nearest delineation contour 84 is less than a threshold value is identified as a constrained vertex. Other techniques can also be used.

With returning reference to FIG. 2, the contouring processor 44 can be applied in various ways. In a substantially manual approach, the user defines two or more different, non-parallel contours 84 using the contouring plane and contour selector components 70, 72 along with the user interface 32. The contours 84 can be curved or straight segments or closed contours. In some circumstances, a structure of interest can be sufficiently delineated by two different non-parallel contours 84, such as a delineating contour in each of a sagittal plane and a coronal plane. Delineation with only a few contours (possibly as few as two contours) is enabled by providing the capability to contour in an arbitrary contouring plane such that contours in different, non-parallel planes can be defined. Effective rapid contouring is further enhanced by selecting the contouring planes as anatomically significant directions that contain the structure of interest, such as the illustrated example $P_{cor}$ and $P_{obl}$ planes that are anatomically significant respective to the example spine S. The mesh 90 is deformed such that the contours are a sub-set of the mesh surface, while the remainder of the mesh is deformed according to an internal energy constraint to ensure the topological integrity of the mesh. Preferably, at least two of the delineating contours are orthogonal or near orthogonal to each other. If the resulting mesh is not satisfactory, an iterative manual refinement can be performed in which the user reviews the mesh 90 superimposed on the image 80 on the display 38, and the existing delineating contours adjusted or additional delineating contours added so as to further constrain and improve the shape of the mesh 90. In a more automated approach, the mesh can be initially deformed to match the image as per FIG. 7, followed by manual defining of contours 84 to correct areas where the automatically fitted mesh is not satisfactory. After manually defining the contours, further automated adaptation can be done with the contours acting as hard constraints.

Moreover, the contouring processor 44 can be applied to adjust the contours for subsequent radiation therapy sessions in an adaptive manner. For example, planning images for planning a subsequent radiation therapy session are expected to be similar to the planning images for the previous radiation therapy session. Differences may include a reduced size of the cancerous tumor or growth due to positive effect of the radiation therapy, shifting or drift of organs or other structures over time, or so forth. These minor changes are readily accounted for by user adjustment of the contouring planes and/or delineating contours, optionally including additional automated optimization. The disclosed contouring processor 44 can similarly be used to adjust a delineating mesh between sessions of other types of adaptive treatment processes.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. A method of delineating a structure of interest in a three-dimensional image or map, the method comprising:
    acquiring a stack of axial image slices defining the three-dimensional image or map;
    manually selecting at least two different contouring planes in the three-dimensional image or map that are different and non-parallel respective to each other;
    manually defining at least two contours delineating the structure of interest, the at least two manually defined contours lying in the at least two different contouring planes that are different and non-parallel respective to each other;
    identifying a sub-set of vertices of the three-dimensional polygonal mesh as constrained vertices to be positioned at or near the manually defined contours based on minimum vertex distance from the at least two manually defined contours; and
    after identifying the constrained vertices, automatically fitting a three-dimensional polygonal mesh to the structure of interest in the three-dimensional image or map with deformation of the constrained vertices being constrained during the automatic fitting by the manually defined contours, wherein the automatic fitting comprises performing an iterative energy or force minimization deformation process including for each iteration:

computing a constraint energy or force term for each constrained vertex, the constraint energy or force term being dependent upon the minimum vertex distance from the at least two manually defined contours computing contrast-based energy or force terms for all vertices of the polygonal mesh derived from contrast delineating at least a portion of the structure of interest in the three-dimensional image or map, and deforming the polygonal mesh to minimize a combination of force or energy terms including at least (i) the constraint force or energy terms for the constrained vertices and (ii) the contrast-based deformation energy or force terms for all vertices of the polygonal mesh.

2. The method as set forth in claim 1, wherein the identifying is repeated for each iteration of the iterative automatic deformation process.

3. The method as set forth in claim 2, wherein the sub-set of vertices identified as constrained vertices changes between at least two successive iterations of the iterative automatic deformation process.

4. The method as set forth in claim 1, wherein the minimum distance used for the selecting is defined by a Euclidean distance transform.

5. The method as set forth in claim 1, wherein each iteration of the energy or force minimization deformation process further includes:

computing deformation energy or force terms derived from an extent of deformation of the three-dimensional polygonal mesh from a default mesh configuration, wherein the deforming minimizes said combination of force or energy terms further including (iii) the deformation energy or force terms.

6. The method as set forth in claim 1, wherein the manual defining comprises:

manually selecting the at least two different contouring planes from the group of planes consisting of sagittal, coronal, and axial planes.

7. The method as set forth in claim 1, wherein the manual defining comprises:

manually selecting the at least two different contouring planes including at least one oblique plane not belonging to the group of planes consisting of sagittal, coronal, and axial planes.

8. An apparatus comprising:

a computed tomography (CT) scanner for acquiring a stack of axial image slices;

a plane selection interface for manually selecting a contouring plane of selectable orientation in a three-dimensional image or map defined by the stack of axial image slices;

a contouring interface for manually defining a contour in the selected contour plane; and a mesh constructor configured to construct a three-dimensional polygonal mesh delineating a structure of interest in the three-dimensional image or map, the mesh constructor identifying a sub-set of vertices of the three-dimensional polygonal mesh as constrained vertices and automatically fitting the three-dimensional polygonal mesh to the structure of interest in the three-dimensional image or map by performing an iterative energy or force minimization deformation process including for each iteration:

computing a constraint energy or force term for each constrained vertex, the constraint energy or force term being dependent upon the minimum vertex distance from the at least two manually defined contours computing contrast-based energy or force terms for all vertices of the polygonal mesh derived from contrast delineating at least a portion of the structure of interest in the three-dimensional image or map, and deforming the polygonal mesh to minimize a combination of force or energy terms including at least (i) the constraint force or energy terms for the constrained vertices and (ii) the contrast-based deformation energy or force terms for all vertices of the polygonal mesh.

9. The apparatus as set forth in claim 8, further including:
a pointing device; and
a display;
the pointing device and the display being components of each of the plane selection interface and the contouring interface.

10. The apparatus as set forth in claim 8, further including:
a planning processor configured to plan a radiotherapy session based on the three-dimensional image or map and the constructed three-dimensional polygonal mesh delineating the structure of interest in the three-dimensional image or map.

11. The apparatus as set forth in claim 10, further including:
a radiotherapy system for performing the planned radiotherapy session.

12. The apparatus as set forth in claim 8, wherein the plane selection interface is configured to enable manual selecting of an axial, sagittal, or coronal contouring plane, and the contouring interface is configured to enable manual defining of a contour in said axial, sagittal, or coronal contouring plane.

13. The apparatus as set forth in claim 12, wherein the plane selection interface is further configured to enable manual selecting of an oblique contouring plane that is not an axial, sagittal, or coronal plane, and the contouring interface is configured to enable manual defining of a contour in said oblique contouring plane.

14. An apparatus operative in conjunction with an adaptive treatment process, the apparatus comprising:

a segmenting processor configured to delineate a structure in a three-dimensional image or map defined by a stack of two-dimensional image slices, the segmenting processor including (i) a contouring interface via which a user manually selects at least two different, non-parallel contouring planes in the three-dimensional image or map and defines structure-delineating contours in the at least two different, non-parallel contouring planes, and (ii) a mesh constructor configured to construct a three-dimensional polygonal mesh using an iterative energy or force minimization mesh deformation process constrained at least by the at least two different, non-parallel manually defined structure-delineating contours, the iterative energy or force minimization mesh deformation process including the operations of:

identifying a sub-set of vertices of the three-dimensional polygonal mesh as constrained vertices to be positioned at or near the manually defined contours based on minimum vertex distance from the at least two manually defined contours;

computing a constraint energy or force term for each constrained vertex, the constraint energy or force term being dependent upon the minimum vertex distance from the at least two manually defined contours computing contrast-based energy or force terms for all vertices of the polygonal mesh derived from contrast delineating at least a portion of the structure of interest in the three-dimensional image or map, and deforming the polygonal mesh to minimize a combination of force or energy terms including at least (i) the constraint force or energy terms for the constrained vertices and (ii) the contrast-based deformation energy or force terms for all vertices of the polygonal mesh; and a planning processor configured to identify parameters for adaptive treatment of a subject based on delineation via the segmenting processor of at least one structure of interest in a three-dimensional image or map of the subject.

15. The apparatus as set forth in claim 14, wherein the planning processor includes:

an inverse planning processor for determining beamlet parameters for delivering a selected radiation profile to the subject; and a conversion processor for converting the beamlet parameters into control parameters for an intensity modulated radiotherapy system.

16. The apparatus as set forth in claim 15, further including:

said intensity modulated radiotherapy system configured to deliver radiation to the subject in accordance with said control parameters.

17. The apparatus as set forth in claim 14, wherein the segmenting processor and the planning processor are configured to be reapplied for subsequent adaptive treatment sessions to adjust the parameters for adaptive treatment between sessions.

* * * * *